No. 12,766. REISSUED MAR. 24, 1908.

R. B. BENJAMIN.

PLURAL LAMP SOCKET.

APPLICATION FILED FEB. 6, 1908.

Witnesses:

Ira D. Perry

W. Perry Halm

Inventor:

Reuben B. Benjamin

By Jones, Addington & Amies

Attys.

UNITED STATES PATENT OFFICE.

REUBEN B. BENJAMIN, OF CHICAGO, ILLINOIS, ASSIGNOR TO THE BENJAMIN ELECTRIC MANUFACTURING COMPANY, OF CHICAGO, ILLINOIS, A CORPORATION OF ILLINOIS.

PLURAL-LAMP SOCKET.

No. 12,766. Specification of Reissued Letters Patent. Reissued Mar. 24, 1908.

Original application filed May 20, 1898, Serial No. 681,202. Renewed August 10, 1901, Serial No. 71,635. Divided and application filed February 7, 1902, Serial No. 93,011. Original No. 721,777, dated March 3, 1903. Application for reissue filed February 6, 1908. Serial No. 414,652.

*To all whom it may concern:*

Be it known that I, REUBEN B. BENJAMIN, a citizen of the United States, residing at Chicago, in the county of Cook and State of Illinois, have invented a certain new and useful Improvement in Plural-Lamp Sockets, of which the following is a full, clear, concise, and exact description, reference being had to the accompanying drawings, forming a part of this specification.

This application is a division of my application filed originally May 20, 1898, Serial No. 681,202, renewed August 10, 1901, Serial No. 71,635.

The subject-matter of this portion of my invention is illustrated in the accompanying drawings, in which—

Figure 1:
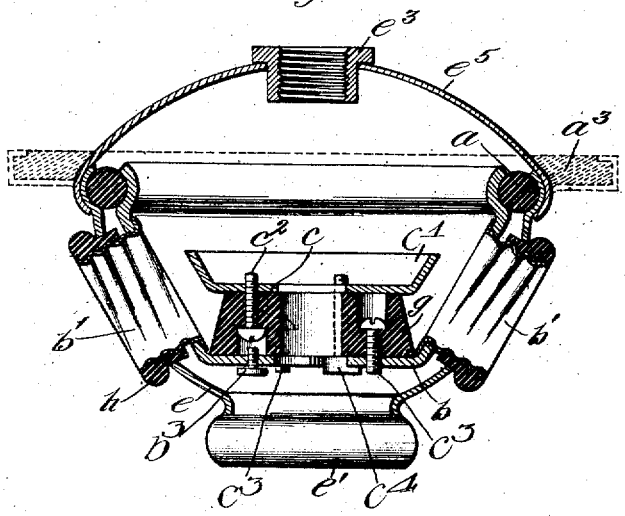
Figure 2:
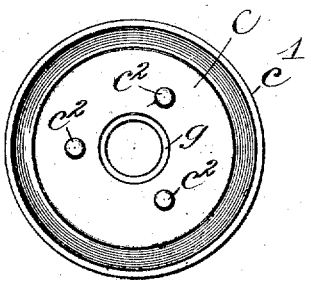
Figure 3:
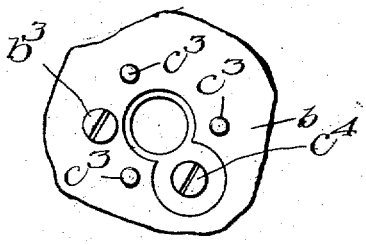
Figure 4:
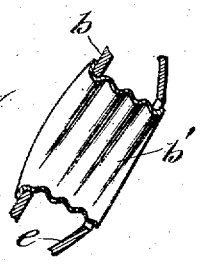

Figure 1 is a sectional view of a plural-lamp socket embodying my invention. Fig. 2 is a top plan view of the inner contact-plate of the invention. Fig. 3 is a bottom plan view of a portion of the lower contact-plate. Fig. 4 is a detail view showing how the threaded shells may be made substantially flush with the casing of the socket.

Like letters refer to like parts throughout the several views.

An insulating sub-base $a$ in the form of a ring of insulating material is adapted to be supported from a casing $e^5$, as shown in full lines, or it may be mounted upon a portion $a^3$, adapted to be secured to the wall, this feature being shown in dotted lines. The casing $e^5$ is provided with a bushing $e^3$, which is adapted to be threaded upon the end of a pipe or other hollow member through which the electric conductors leading to the contacts of the socket may be brought. Upon the under side of this sub-base $a$ is supported a bowl-shaped contact-plate $b$, having oblique side walls and being secured at the upper edge to the insulating sub-base in the manner shown or in any other suitable manner. Upon the oblique side walls are mounted the threaded shells $b'$ $b'$, which are adapted to receive the lamp-bases. Upon the central portion of this contact-plate $b$ is supported an insulating-block or base $g$, upon the upper face of which is mounted a contact-plate $c$, the rim $c'$ of which is turned upward and constitutes the contacts for the central terminals of the lamps when the bases thereof are screwed into the shells $b'$. The plate $c$ is secured to the block or base $g$ by means of suitable screws $c^2$ $c^2$, and the block or base $g$ is secured to the plate $b$ by means of one or more screws $c^3$, the heads of which are adapted to be countersunk beneath the upper face of the block or base $g$.

One of the conductors forming one side of the electric circuit of the socket may be brought through the pipe or tube connected with the bushing $e^3$ and secured to a screw or binding-post $c^4$, mounted upon the central contact-plate $c$. The other conductor may be passed through the central apertures in the contact-plate $c$, the base or block $g$, and that in the central portion of the plate $b$ and connected with the screw or binding-post $b^3$. With this arrangement of the conductors the plates $c$ and $b$ constitute the opposite terminals of the socket, and when the several lamps are secured into position they are connected in parallel.

A casing $e$ surrounds the lower portion of the socket and is provided with openings to accommodate the shells $b'$ and the bushings $h$. It is secured at its upper edge to the sub-base $a$ and is provided upon its lower end or portion with a removable cap or cover $e'$, situated centrally with reference to the individual sockets. This cover may be removed when it is desired to gain access to the binding-screw $b^3$. A bushing $h$ is illustrated as interposed between the shell $b'$ and the casing $e$ and serves to insulate the same and to aline the apertures in the contact-plate $b$ and casing $e$, as well as to assist in holding and supporting the casing $e$ in position.

In Fig. 4 a modification is shown in which the threaded shells $b'$ are flush with the casing $e$.

The bowl-shaped contact-plate described forms an electrical conductor to convey the current to the ring-terminals of the lamps, thus dispensing with wiring, and at the same time it forms an effective mechanical support without the provision of an additional supporting structure.

By the statement in the following claims that certain parts are associated with or carried by the base I broadly contemplate associating said parts with the base in any suitable manner.

I am aware that clusters of sockets have heretofore been constructed by associating together a plurality of separate and individual lamp sockets each having its own insulating base, lamp contacts, and individual pair of binding posts, and connected to the electric circuit by means of spliced leading-in connections or individual lamp wires, and I disclaim such structures.

By the terms "electrical connections," "conductors," "conducting parts or members," and like terms used in the accompanying claims, I mean the conducting parts or members of the organized structure by which the contacts for the lamps are interconnected in the desired circuit relation, and whereby suitable connection terminals may be provided for readily connecting the leading-in wires with the cluster.

Having thus described my invention, what I claim as new and desire to secure by Letters Patent, is:

1. In a plural-lamp socket, the combination with a suitable base, of a contact-plate mounted on said base, a plurality of shells for the lamp-bases carried on said plate, an exterior casing having openings to accommodate the lamp-bases, and insulating-rings passing through said openings and engaging said shells, substantially as described and for the purposes set forth.

2. In a plural-lamp socket, the combination with a suitable base, of a contact-plate mounted on said base, a plurality of threaded shells for the lamp-bases carried on said plate, an exterior casing having openings to accommodate the lamp-bases, and threaded insulating-rings passing through said openings and threaded upon said shells, substantially as described.

3. A cluster-lamp socket comprising an insulating-base, suitably supported lamp-holding devices and associated contacts associated with said base, conducting parts or members interconnecting said contacts in the desired circuit relation, suitable connection terminals for the leading-in wires, a casing having an opening opposite each lamp-holding device, and insulating-rings associated with said openings to maintain the same in alinement with said lamp-holding devices.

4. A cluster-lamp socket comprising an insulating-base, suitably supported lamp-holding devices and associated contacts associated with said base, conducting parts or members interconnecting said contacts in the desired circuit relation, suitable connection terminals for the leading-in wires, a casing having an opening opposite each lamp-holding device, and insulating-rings fitting in said openings and secured to parts supported upon said base independently of said casing.

5. A cluster-lamp fixture comprising an insulating-base, a plurality of threaded shells suitably associated therewith, a casing having an opening opposite each shell, and insulating-rings fitting in said openings and secured to said shells.

6. In a cluster-fixture, the combination with a base of insulating material constructed to receive sockets for electric lamps, of threaded metallic lamp-sockets suitably associated with said base, conducting parts or members directly joining respectively the like contacts of said sockets, a metallic cover having holes registering with the sockets, and threaded insulating-bushings screwed over the sockets and constructed to hold the cover on the base and insulate the sockets from the cover.

7. The combination with a suitable base, of a casing having a plurality of openings, a plurality of threaded shells within said casing registering with said openings, insulating-rings interposed between the exterior of said shells and the walls of said openings to hold said casing in position rotarily, and center contacts suitably associated with said base.

8. A cluster lamp socket having an insulating sub-base, a contact-plate mounted thereon and having oblique side walls, contacts for the ring-terminals of the lamps carried upon said oblique walls, an insulating-base or block mounted upon the lower portion of said plate, and center contacts for the lamps mounted upon said base or block, substantially as described.

9. An electric-light-lamp cluster comprising an insulating-base, a plurality of lamp-receivers supported upon said base, center contacts associated therewith, and a finishing cap or cover independent of the receivers and having openings registering with the receivers to permit the insertion of the lamps, and insulating-rings interposed between the receivers and the finishing cap or cover.

10. An electric-light-lamp cluster consisting of an insulating-base, a plurality of lamp-receivers supported by said base, center contacts associated therewith, and a finishing or protecting cap or cover separated from the receivers by insulating material.

11. An electric-light-lamp cluster consisting of an insulating-base, a plurality of lamp receivers supported by said base, center contacts associated therewith, conducting parts or members interconnecting said receivers and contacts in the desired circuit relation, suitable connection terminals for the leading-in wires, and a finishing or protecting cap or cover separated from the receivers by insulating material.

12. An electric-light-lamp cluster consisting of an insulating-base, a plurality of lamp-receivers supported upon said base, center contacts associated therewith and a finishing cap or cover independent of the receivers and having openings registering with the receivers to permit the insertion of the lamps, said finishing cap or cover being separated from the receivers by insulating material and the edges of said cap or cover being adapted to rest against said insulating-base.

13. An electric-light-lamp cluster, a plurality of metallic receivers for the lamps carried by the base, a center contact for each receiver, electric connections extending to the receivers and center contacts, and an independent finishing or protective cover separated from the receivers by insulating material, as described.

14. An electric-light-lamp cluster, comprising an insulating-base, a finishing cap or cover having a plurality of openings for the insertion of the lamp-bases, a plurality of lamp-receivers suitably supported within said cap or cover one opposite each of said openings, suitably supported center contacts, conducting parts or members interconnecting said receivers and contacts in the desired circuit relation, suitable connection terminals for the leading-in wires, said receivers being separated from said finishing cap or cover by insulating material.

In testimony whereof I have signed my name to this specification, in the presence of two subscribing witnesses.

REUBEN B. BENJAMIN.

Witnesses:
W. PERRY HAHN,
ROBERT LEWIS AMES.